US012805627B2

(12) United States Patent
Ben Meir

(10) Patent No.: US 12,805,627 B2
(45) Date of Patent: Nov. 24, 2026

(54) REMOVABLE COVER KIT FOR AN ELONGATE ARTICLE

(71) Applicant: Tetro Ltd., Quarry Bay (HK)

(72) Inventor: Ilan Ben Meir, Ra'anana (IL)

(73) Assignee: TETRO LTD., Quarry Bay (HK)

( * ) Notice: Subject to any disclaimer, the term of this patent is extended or adjusted under 35 U.S.C. 154(b) by 852 days.

(21) Appl. No.: 18/190,619

(22) Filed: Mar. 27, 2023

(65) Prior Publication Data

US 2023/0329427 A1 Oct. 19, 2023

(30) Foreign Application Priority Data

Apr. 14, 2022 (IL) .......................................... 292289

(51) Int. Cl.

*B25G 1/10* (2006.01)
*A45F 5/10* (2006.01)
*B25G 1/00* (2006.01)

(52) U.S. Cl.

CPC ................ *A45F 5/10* (2013.01); *B25G 1/102* (2013.01); *A45F 2005/108* (2013.01)

(58) Field of Classification Search

CPC ....... A45F 5/10; A45F 2005/108; B25G 1/10; B25G 1/102; F24F 1/34
USPC .......................................................... 294/137
See application file for complete search history.

(56) References Cited

U.S. PATENT DOCUMENTS 3,008,252 A * 11/1961 Robinson ................ D06F 83/00 38/141
4,389,777 A * 6/1983 Landsberger ............ B25G 1/10 30/340
5,109,803 A 5/1992 Dunham et al.
(Continued)

FOREIGN PATENT DOCUMENTS

EP 2289604 A2 3/2011
EP 4260989 A1 * 10/2023 ............... B25G 1/10
(Continued)

OTHER PUBLICATIONS

Airex (Money Saving HVAC Tips and AIREX Pro System Kit Review), found at: https://www.youtube.com/watch?v=T-5AO3VnJYk (Year: 2020).*
(Continued)

*Primary Examiner* — Mahdi H Nejad
(74) *Attorney, Agent, or Firm* — Ballard Spahr LLP

(57) ABSTRACT

A removable cover kit for an elongated article, comprising a padding for removably encasing at least a portion of the article, the padding configurable between a closed configuration when the padding is mounted on the article and an open configuration for mounting of the padding on the article or for removal of the padding therefrom. The padding comprises one or more padding parts associated with the padding edges, and defines a housing when in the closed configuration, in which the padding edges are proximate to one another along respective edges thereof and an inner surface of the padding extending between the edges fits that of the portion of the article. In the open configuration, the
(Continued)

padding edges are remote from one another. The kit further comprises a sleeve for sheathing over the padding when the padding is in the closed configuration and mounted to the article.

17 Claims, 9 Drawing Sheets

(56) References Cited

U.S. PATENT DOCUMENTS 5,722,672 A * 3/1998 Frederick .................. B62B 5/06 16/904
6,419,601 B1 * 7/2002 Kenner ................ A63B 71/141 81/177.1
6,796,002 B2 9/2004 Beckwith
10,569,149 B2 * 2/2020 Clarke ................... A63B 60/20
2007/0017540 A1 * 1/2007 Davis ....................... B25G 1/10 132/75.5
2013/0312650 A1 11/2013 Smith
2017/0073114 A1 3/2017 Cartlidge
2019/0210211 A1 * 7/2019 Reece .................... B25G 1/102
2021/0111109 A1 * 4/2021 Rodriguez .......... H10W 70/475
2021/0205679 A1 7/2021 Moody et al.
2021/0364121 A1 * 11/2021 Pilone ................... F16L 59/147
2022/0227408 A1 * 7/2022 Glimcher ................ B62B 5/069

FOREIGN PATENT DOCUMENTS

FR 1099833 A 9/1955
JP H11285989 A 10/1999

OTHER PUBLICATIONS

Air Conditioner With Sub-indoor Unit; Document ID: KR 20210111109 A; Inventor: Seo Ki Won, Sung Sik Choi; Application No. KR 20200026215 A; Date Filed: Mar. 2, 2020; Date Published: Sep. 10, 2021 (Year: 2021).*
Cooper and Hunter Line Set Cover (Year: 2026).*
Alpine Line Set Covers, found at: https://www.youtube.com/watch?v=xb4AfdSDTQE (Year: 2009).*

* cited by examiner

REMOVABLE COVER KIT FOR AN ELONGATE ARTICLE

TECHNOLOGICAL FIELD

The subject matter of the present patent specification relates to a soft touch cover removably mountable on an elongate article.

BACKGROUND

Articles with which a cover of the above kind can be used are normally those that need to be grasped, especially those that need to be grasped relatively firmly for extended periods.

GENERAL DESCRIPTION

The subject matter of the present patent specification is particularly advantageous for use with articles that need covers having an interior corresponding in shape and dimensions to that of at least a portion of the article to be covered, especially when the article has such a configuration that the cover cannot be easily dressed on the article from one of its ends.

One non-limiting example of such an article is a handle of a device for carrying and/or transporting a child, e.g. a transportable car seat or stroller, or for carrying and transporting belongings, e.g. a luggage trolley. Other examples of articles with which the subject matter of the present patent specification can be used are bottles and graspable portions of hand-held domestic appliances or working instruments.

In accordance with an aspect of the presently disclosed subject matter, the removable cover kit comprises:

- a padding for removably encasing at least a portion of the article having a predetermined length, the padding comprising one or more padding parts associated with padding edges and being configurable between:
  - a closed configuration, which the padding has at least when it is mounted on the article so that a longitudinal axis of the padding extends along the length of said at least a portion of the article, and in which the padding edges are proximate to one another along respective lengths thereof and an inner surface of the padding extending between said edges fits that of the at least a portion of the article; and
  - an open configuration, which the padding has at least during mounting of the padding on the article or removal of the padding therefrom, wherein the padding edges are remote from one another; and
  - a sleeve for sheathing over the padding when the padding is in the closed configuration and mounted to the article.

Advantageously, the kit is configured to be assembled directly to an article or portion thereof to form a cover that is to be manually grasped by a user, without needing to pull or slide the cover on the article when assembling it on the article or portion thereof. It is also envisaged that the article need not be detached from the device to assemble or remove the cover, e.g. for replacing it or for recycling components of the article when no longer useable. To these ends, the padding is configurable between its open configuration, in which it can be directly mounted to or removed from the article, and its closed configuration, in which the padding encases the article portion to which it is applied, and the sleeve is configured to sheathe over the padding once the padding is mounted to the article. As the sleeve sheathes over the padding, the sleeve retains the padding edges proximate to one another. The sleeve can have a tubular form so as to inhibit separation of padding parts from each other. The sleeve may be openable and/or otherwise removable from the padding to enable removal of the padding from the article.

The padding may comprise at least two padding parts, each formed with a recess bounded by two padding edges which, in the closed configuration of the padding, are disposed very close to or are in contact with respective padding edges of another padding part at least most of the respective lengths of the padding edges. For example, the padding may comprise a pair of elongate semi-tubular padding parts which, when assembled, have a cross-sectional shape corresponding to that of the portion of the article on which the padding is to be mounted. Such shape is normally circular or oval, but if desired it can have some other curved regular or irregular form.

In one example, the padding can comprise two or more padding parts configured to be brought together into the closed configuration over the at least a portion of the article for encasement thereof, the respective recesses of the at least two padding parts having shape and dimensions corresponding to those of the respective surfaces of the at least a portion of the article. In at least the closed configuration, the padding defines an elongate housing with a channel defined by the inner surface, the channel being shaped and sized to receive the article or at least a portion thereof.

When the cross-sectional shape of the elongate article, or portion thereof that is to be encased by the padding, is generally circular or oval, each of the semi-tubular padding parts can have a semi-circular or semi-oval cross-section, wherein the opposed 'tips' of the semi-circle or semi-oval define the respective padding edges which run along the length of each semi-tubular padding part, and wherein the hollow opening (i.e. recess) of the semi-circle or semi-oval is configured to receive a corresponding portion of the article.

The sleeve of the present kit may be configurable between:

- an open state in which the sleeve is applicable over the padding when the padding is in the closed configuration and mounted to the article; and
- a closed state in which the sleeve is secured over and sheathes the padding when the padding is in the closed configuration and mounted to the article.

The sleeve may function as a protective covering that can also help retain the padding to the article.

The sleeve may be configured to be applicable to the padding and article and removable therefrom simultaneously along the entire length of the padding. This can be achieved, for example, by the sleeve comprising two longitudinal ends that are connectable to one another to bring the sleeve from the open state to the closed state. For example, in the open state, the sleeve may have a substantially rectangular form, the long ends of which may be removably securable to one another via fastening means such as a zipper, buttons, snaps, hook-and-loop means, etc. The sleeve can thus be wrapped around the padding and then be brought into the closed state by securing the opposed longitudinal ends of the sleeve together around the padding to removably sheathe or cover it.

In an example of the sleeve, when it is in the open state the sleeve has a lateral dimension that may vary along the length thereof. In the closed state, the sleeve has a corresponding cross-sectional area which may vary along the length of the sleeve. In a further example, when the sleeve is in the open state, the lateral dimension of the sleeve is smaller at opposed lateral ends thereof than along a majority of the remainder of the sleeve. Correspondingly, when the sleeve is in the closed state, the cross-sectional area of the sleeve is smaller at opposed lateral ends of the sleeve than along a majority of the remainder of the sleeve. In this example, when in the open state, the sleeve may generally be in the form of a sheet-like material having the shape of a rectangle the corners of which are replaced with inverted rounded corners. Meanwhile, in the closed state, the sleeve may generally have a cylindrical form, wherein the lateral ends of the cylinder constrict or narrow radially inwardly. In this way, when assembled, most of the sleeve along its length has a first inner diameter that is sized to tightly sheathe the padding. Toward and/or at the respective lateral ends thereof, the inner diameter of the tubular sleeve reduces to a second inner diameter that is smaller than the first inner diameter and is sized to tightly sheathe respective adjacent article portions protruding from the padding. In this way, although the padding, when mounted to an article portion, has an outer diameter that is larger than that of respective adjacent article portions protruding from the padding, the sleeve, with its variable inner diameter, can tightly sheath both the padding and the article portions protruding outwardly from lateral ends of the padding.

The present removable cover kit may also comprise a pair of end elements, each being removably securable to one of the respective regions of the article adjacent the portion where the padding and the sleeve are mounted so as to at least partially cover lateral ends of the padding and/or lateral ends of the sleeve from which said respective areas of the article protrude when the kit is assembled to the article.

In examples of the kit, the sleeve and/or padding may be formed from relatively flexible or otherwise deformable materials, and the end elements help to protect their ends by substantially covering the otherwise exposed lateral ends of the padding and/or sleeve. The end elements also act as stoppers to prevent the padding and sleeve from sliding or otherwise moving relative to the article when the kit is assembled. In examples of the kit, the padding is made of a material incapable of being stretched to an extent such that, if a unitary tubular casing having an inner surface of the same shape and dimensions as those of the inner surface of the padding when in the closed configuration, was to be produced from such material, that casing would be incapable of being dressed over the article from an end thereof. In one example, the padding is made of a material in the form of an expanded particle foam, such as polypropylene. The sleeve may be at least partially made from synthetic or natural leather.

Each end element may be removable from the respective article regions or may be movable along the article away from respective lateral ends of the sleeve to permit removal of the padding from the article. To facilitate securing the end elements to and removal of them from the article without requiring the article to be detached from the device, the end elements may also be configurable between an unlocked state in which they are mountable to the article and a locked state in which they are tightly fixed to the article.

The present removable cover kit may also comprise a pair of end coverings, each being removably securable to one of respective areas of the article so as to, when the kit is assembled, substantially cover respective end elements and/or respective lateral ends of the sleeve. The end coverings may serve a protective and/or aesthetic function, may offer a soft and/or premium touch, and may prevent physical access and manipulation of the end element concealed by the end covering. As such, to access and remove an end element, the end covering must first be removed from the corresponding article area to which it is secured.

The removable cover kit in accordance with this aspect of the presently disclosed subject matter can have any of the features specified above in any combination thereof.

According to another aspect of the subject matter of the present specification there is provided an elongated article fitted with a removable cover assembled from a kit of the kind described above. In one example, the elongated article is a handle. As such, the cover kit of the presently disclosed subject matter may be applied to an elongate handle, such as the push handle of a stroller or the like. Since the cover kit of the presently disclosed subject matter can be easily attached and removed from elongated articles, the cover kit may be particularly suitable for handles which can have non-linear configurations, e.g. a handle having a U-shape, defined by a pair of parallel lateral arms interconnected by a central and perpendicularly extending graspable handle portion, including such frames having varying cross-section along their length.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

A removable cover kit according to examples of the presently disclosed subject matter may be mounted to an elongated article and removed therefrom without requiring the article to be detached from a device to which it is secured or to be secured. While the present specification may primarily discuss the present kit in relation to an article in the form of a handle having the shape of a frame, such as a carrying handle of an infant car seat or a push handle of a stroller, it will be appreciated that the present kit may be used with other types of elongated articles and handles, including the push handles of shopping trolleys, luggage trolleys, exercise equipment, bicycle handlebars and the like.

In general, a kit according to the presently disclosed subject matter comprises padding operable between an open configuration in which the padding can be removed from or applied to an elongated article such as a handle, and a closed configuration in which the padding encases the handle, or at least a portion thereof. In this way, the padding can be applied directly to and over the handle portion that it is to encase and need not first be slid or pulled up adjacent portions of the handle toward the portion to be encased. The kit may also comprise a sleeve that can sheathe or otherwise be applied over the padding when the padding is in the closed configuration and mounted to a handle.

Figure 1:
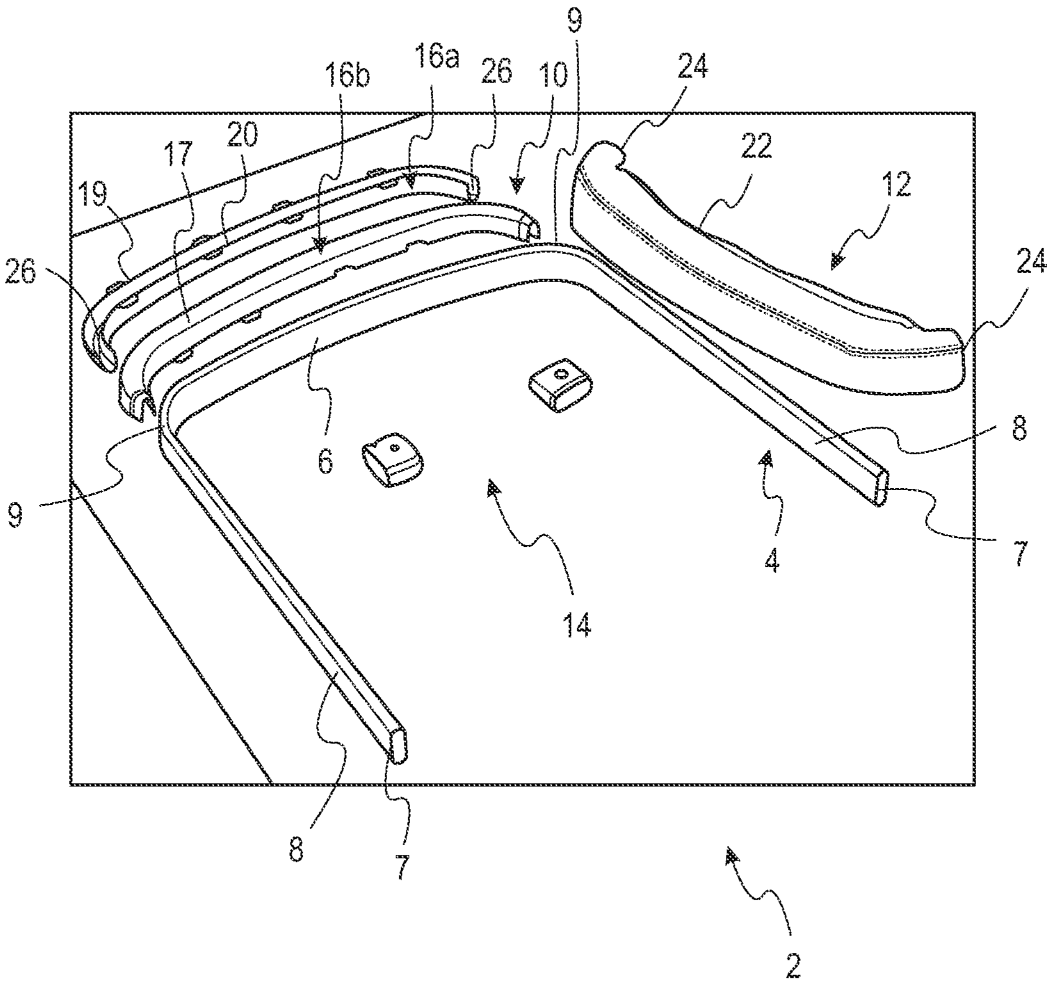
FIG. 1 is a front perspective view of components of an unassembled cover kit according to an example of the presently disclosed subject matter, along with an elongated article, in the form of a handle, on which the kit is configured to be assembled.

FIG. 1 shows components of a removable handle cover kit 2, according to one example of the presently disclosed subject matter, along with a U-shaped handle 4 to which the kit 2 is to be assembled. The handle 4 comprises a central elongate portion 6, a pair of arms 8 extending laterally from respective ends of the central portion 6 and having free ends 7 via intermediate regions 9 of the central handle portion 6 at which it merges with the arms 8. The free ends 7 of the lateral arms 8 may ordinarily be attached to a device, e.g. a car seat or stroller for accommodating a child therein, which is to be carried or wheeled by means of the handle.

Figure 4A:
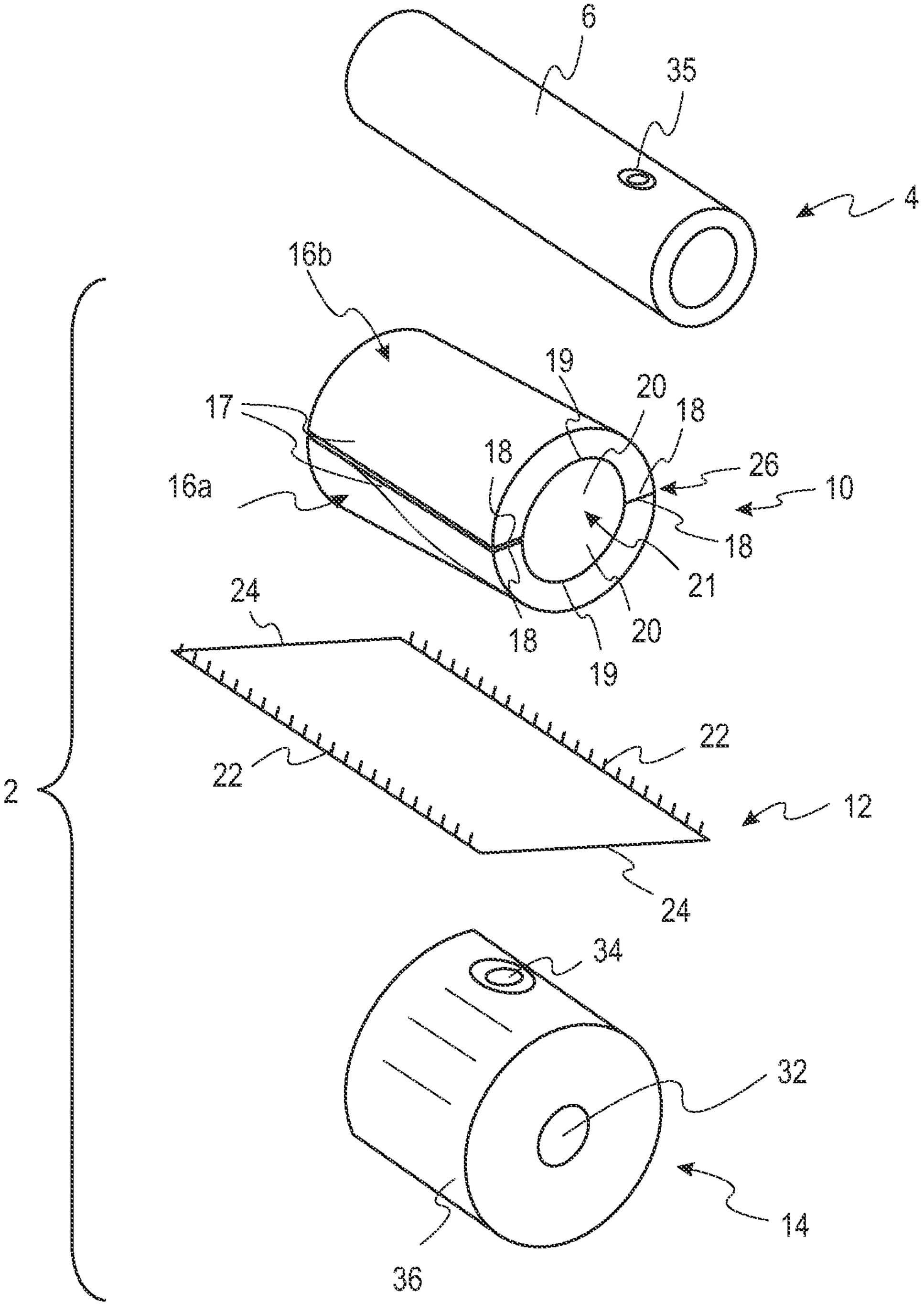
FIG. 4A is a schematic illustration of a partially exploded view of a removable cover kit and a handle, according to a further example of the presently disclosed subject matter.

FIG. 4A schematically illustrates components of a removable handle cover kit 2, according to another example of the presently disclosed subject matter, along with an elongate portion 6 of a handle 4, to which the kit 2 is to be assembled. The handle 4 to which the cover kit 2 of this example is configured to be mounted, might not have lateral arms and, accordingly, its elongate handle portion 6 might not have intermediate handle portions 9.

The description of the removable cover kit and the manner of its assembly on the handle 4 presented below should be considered as applicable both to the cover kit 2 of FIG. 1 and to the cover kit 2 of FIG. 4A unless specifically indicated otherwise.

The depicted kit 2 comprises a padding 10 and a sleeve 12, configured to be assembled on the handle portion 6 of the handle 4.

The depicted kit 2 also comprises a pair of optional end elements 14 that are securable to the handle arms 8 to help cover and protect lateral ends of the padding 10 and/or sleeve 12.

Figure 2A:
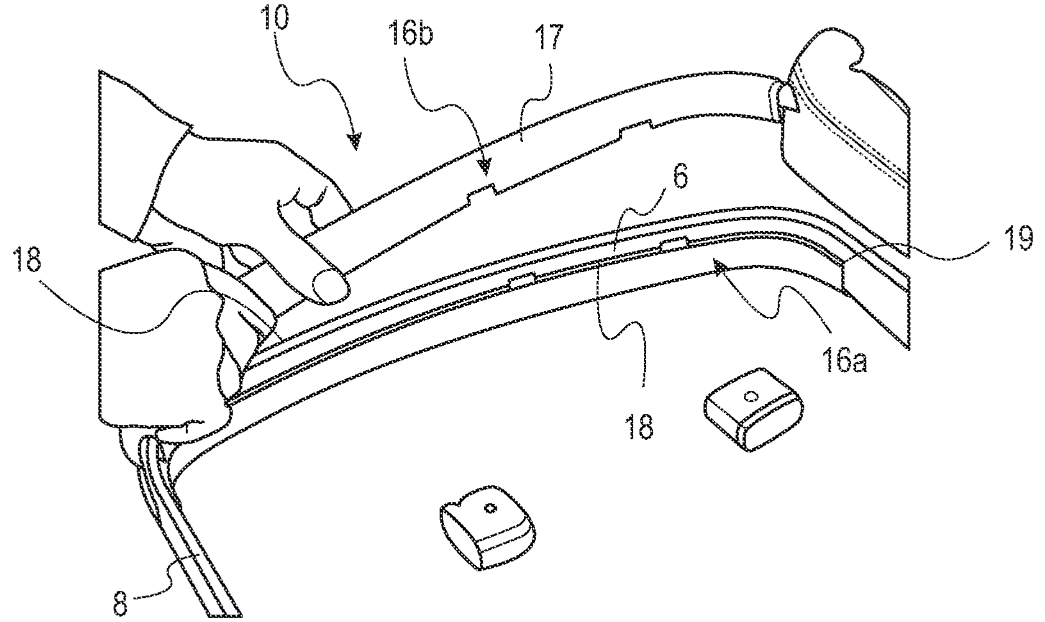
FIGS. 2A to 2C illustrate a sequence of operations by which the kit of FIG. 1 can be assembled to the handle.

Referring to FIG. 2A, the padding 10 comprises a pair of elongate padding parts 16, each being shaped to tightly encase the central elongate portion 6 of the handle 4. In particular, each elongate padding part 16 comprises an outer surface 17, an inner surface 19 defining an elongate recess 20 shaped and sized to receive a corresponding portion of the central handle portion 6, and a pair of edge surfaces 18 (also referred to as padding edges) therebetween, along which the two padding parts are configured to contact each other to create a channel 21 corresponding in shape and dimension to the elongate portion 6 of the handle 4.

Referring to FIG. 4A, each padding part 16*a*, 16*b* comprises a respective inner surface 19, and each inner surface 19 defines a respective recess 20. A channel 21 is formed when the recesses 20 of the padding parts 16 are brought together.

In the examples of FIGS. 1 and 4A, each padding part 16 has a semi-circular cross-sectional shape of its inner and outer surfaces 17 and 19. However, the cross-sectional shape of the inner and outer surfaces of each padding part does not need to be the same and does not need to be semi-circular. For example, the cross-sectional shape of the inner surface can be semi-oval, and the cross-sectional shape of the outer surface can be circular. Moreover, if for whatever reason it is desired to provide the handle with a special shape that is not a regular shape and/or that changes along the length of the handle, the inner surface of the padding parts may have a corresponding cross-sectional shape, whilst the outer surface can have any other desired shape.

The respective surfaces of the padding edges 18 of each of the padding parts can be flat, as best seen in FIG. 4A, or can have complementary shapes. For example, the edge surfaces of one of the parts can comprise one or more protrusions and the edge surfaces of the other part can comprise corresponding one or more recesses configured to receive the protrusion/s when the padding is assembled on the handle portion, thereby connecting the two padding parts to each other until the sleeve is secured on the padding when assembled on the handle portion.

The manner of assembling the cover from the above-described components of the kit 2 on the handle portion 6 will now be described with reference to FIGS. 2A to 2C.

FIG. 2A illustrates how the padding parts 16 are assembled to form a padding 10 for encasing the handle portion 6 of the handle 4. First, the handle portion 6 is inserted into the elongate recess 20 of a first one of the two padding parts, e.g. a lower padding part designated as 16*a* in FIG. 2A. Since the height of the central handle portion 6 exceeds that of the recess 20, only about a bottom half of the handle portion 6 is encased or housed in the recess 20 of the lower padding part 16*a*. As such, the pair of padding edge surfaces 18 of the lower padding part 16*a* extend along the handle portion 6 at approximately the midpoint of the height thereof, and the remainder of the handle portion 6 protrudes upwardly from the recess 20 and padding edge surfaces 18 of the lower padding part 16*a*.

Figure 2B:
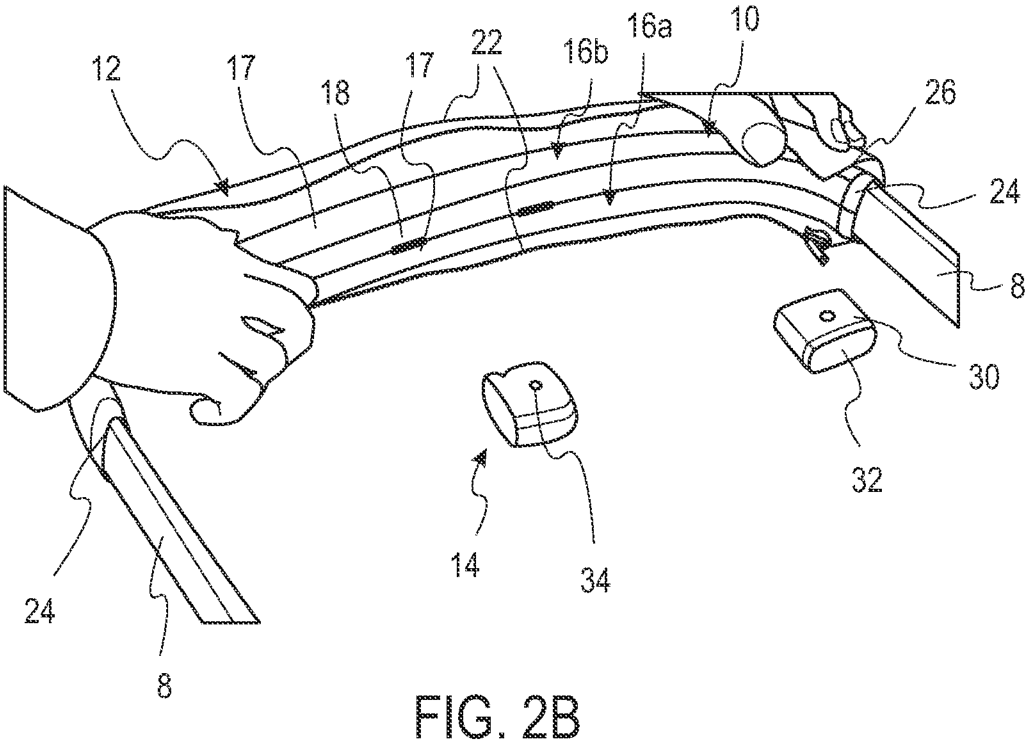

Next, the second padding part 16, i.e. its upper part designated as 16*b* in FIGS. 2A and 2B, is applied over the protruding part of the central handle portion 6 such that it is received in the elongate recess 20 of the second padding part 16*b* and the padding edge surfaces 18 of the upper part 16*b* abut or at least are brought into close proximity with those of the first padding part 16*a*, whereby the padding 10 is brought from its open configuration into its closed configuration.

In the present examples, in the closed configuration of the padding 10, the padding edge surfaces 18 of the second padding part 16*b* are proximate to or in contact with the opposed respective padding edge surfaces 18 of the first padding part 16*a* along the entire lengths of the padding edges 18 thereof. However, this does not need to be the case, i.e. it might be sufficient that, in the closed configuration of the padding 10, the padding edge surfaces 18 are disposed at close proximity to each other or are in contact with each other at least along a majority of their lengths.

Thus, when brought together to encase the central handle portion 6 therebetween, the padding parts 16*a*, 16*b* effectively define padding 10 in the form of a tubular housing having a central elongate through channel 21, defined by the two recesses 20, that receives the handle portion 6. To remove the padding 10 from the handle portion 6, the padding parts 16*a*, 16*b* and thus the corresponding padding edge surfaces 18 thereof can simply be separated from one another and from the central handle portion 6, thus bringing the padding 10 from its closed to its open configuration. In other words, to remove the padding 10 from the handle portion 6, the padding edges 18 of the respective padding parts 16 can simply be separated or spaced from one another.

It is envisaged that the padding 10 may be formed from a relatively resilient and protective material that is soft to touch, such as a material comprising a thermoplastic polymer. Preferably, the thermoplastic polymer can be recyclable. In a specific example, the material from which the padding parts 16*a*, 16*b* are made can be in the form of expanded particle foam such as e.g. EPP (expanded particle polypropylene).

Whilst in the present examples the padding parts 16 of the padding 10 are identical, this does not necessarily need to be the case. For example, one of the padding parts can constitute a major part configured to encase the handle portion 6 along a majority of its circumference and the other padding part can constitute a minor part configured to contact the remainder of the circumference of the handle portion 6 when the padding is assembled thereon. Moreover, the padding parts 16*a*, 16*b*, particularly their edge surfaces 18, may have complementary features to facilitate retention of the padding parts 16 to one another in the closed configuration and over the central handle portion 6 before the sleeve 12 is secured thereon.

While the padding 10 of FIGS. 1 and 4*a* is formed of two padding parts 16, the padding may of course be formed from less or more padding parts configured to substantially house or encase at least a portion of an elongate handle 4.

FIG. 2B shows the padding parts 16 of FIG. 1 mounted to and encasing the central handle portion 6 and it further shows the sleeve 12 in its open state prior to its being secured to the padding 10 to sheathe it over the encased handle portion 6. The sleeve 12 is configured to provide a protective cover over the padding 10 and help retain the padding 10 to the encased handle portion 6. In other words, when the sleeve 12 is applied over the padding 10, the sleeve 12 inhibits separation of the padding parts 16*a*, 16*b* from one another and/or configuration of the padding 10 to the open configuration. Thus, to enable removal of the padding 10 from the handle 4, the sleeve 12 must first be removed before the padding 10.

The sleeve 12 may be made of leather (natural or artificial) to provide a relatively premium tactile experience for the user. Of course, the sleeve 12 can be formed from other protective materials, such as fabric, rubber or the like. The material can have a desired degree of elasticity.

In FIGS. 1 to 2C and 4A, the sleeve 12, when in its open state, is in the form of a rectangular piece of a sheet material as best seen in FIG. 4A. The rectangular sleeve 12 comprises two longitudinal ends 22 that can be secured to one another along the lengths thereof, thereby configuring the rectangular sleeve 12 into its closed state, in which the sleeve 12 has a tubular form arranged to sheathe the correspondingly shaped padding 10.

In general, the longitudinal ends of the sleeve 12 can be reversibly securable to each other by any appropriate means. In the present examples, they are configured to be zipped together, though other reversible closing or fastening means can be utilised, including buttons, snaps and hook-and-loop arrangements. Alternatively, the sleeve can be in the form elastic tubular sleeve that simply slides over the padding 10 to sheathe it, rather than having a sleeve that is selectively openable via fastening means. However, in the former case, in order to pull the sleeve over the padding 10 assembled on the handle portion 6, the ends 7 of the handle 4 need to be free of connection thereof to a device with which the handle 4 is to be used.

The length of the sleeve 12 can be equal to, exceed or be smaller than, that of the padding 10 depending on whether the end elements 14 are to be used. The sleeve can be longer than the padding and can have its lateral ends narrower than the remainder of the sleeve so that, when the sleeve is secured on the padding assembled on a handle portion, the lateral ends of the sleeve are tightly fixed to areas of the handle protruding from the padding. In this case, when the end elements 14 are to be used, they can be configured for covering the lateral ends of the padding if the padding protrudes from the lateral ends of the sleeve, or the lateral ends of the sleeve if they protrude from the corresponding ends of the padding, or both.

Figure 2C:
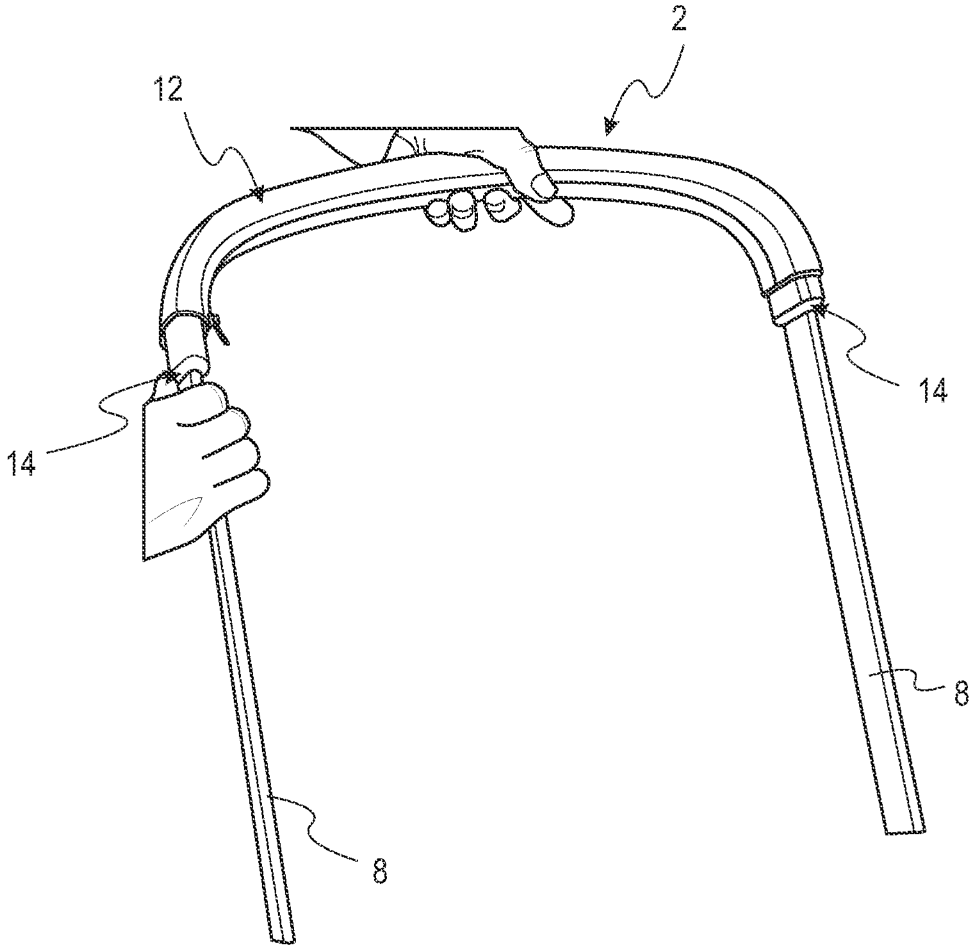

FIG. 2C shows the sleeve 12 in its closed state wherein the longitudinal ends 22 thereof have been secured to one another such that the sleeve 12 sheathes, covers, or otherwise substantially encloses the padding 10 except for the ends of the padding (not seen) on which the end elements 14 are mounted.

Figure 4B:
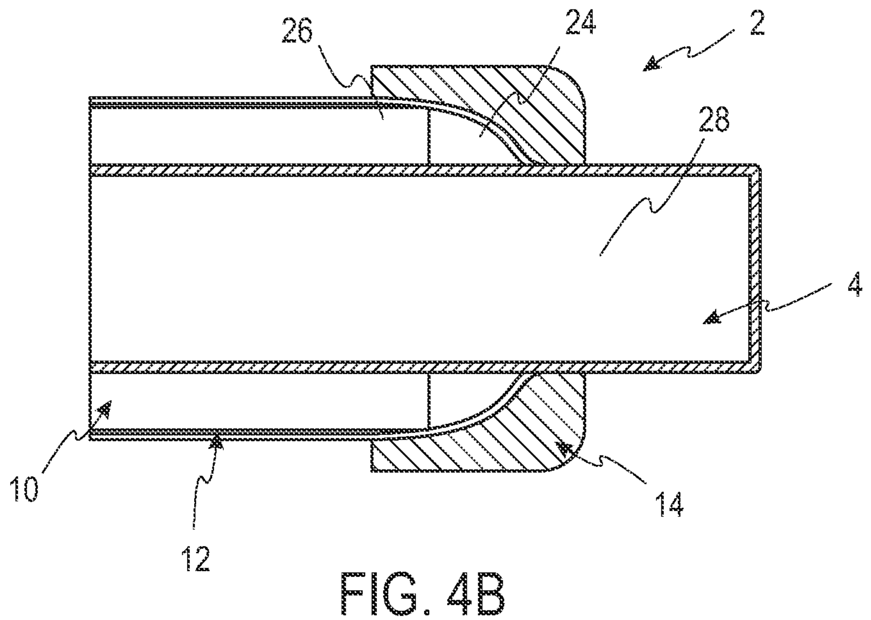
FIG. 4B is a schematic illustration of a close-up longitudinal cross-sectional front view of a lateral end of the kit of FIG. 4A assembled to the handle.

FIG. 4*b* shows a schematic cross-sectional view of a lateral end of the padding 10, the tubular sleeve 12 secured over the handle portion 6, and the end element 14 mounted thereon and covering the lateral ends 24 and 26 of the sleeve 12 and the padding 10, respectively, to protect these ends. More particularly, in the depicted example, the tubular sleeve 12 has a length between its lateral ends 24 which exceeds that of the padding 10 between its lateral ends 26. As such, when assembled, the lateral ends 24 of the tubular sleeve 12 encase the respective lateral ends 26 of the padding 10, as well as respective adjacent handle regions 28 that protrude out from respective lateral ends 26 of the padding 10.

Figure 3:
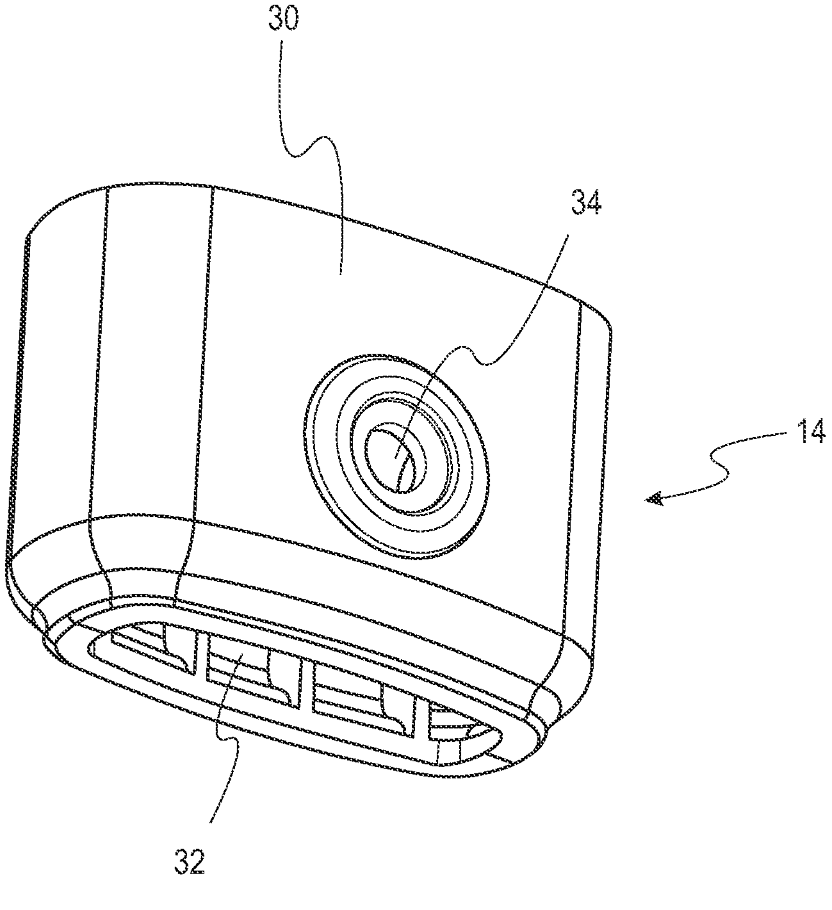
FIG. 3 is a schematic illustration of a side perspective view of an end element that can form part of a removable cover kit, according to one example of the presently disclosed subject matter.

As seen in FIGS. 1 to 4A, each end element 14 is in the form of a tubular housing 30 having a longitudinal through-hole 32 for receiving respective arms 8 of the handle 4. FIG. 3 shows one example of the end element 14, which has a central opening 34 configured to receive a fastening element, such as a screw, which allows for the releasable fixing of each end element 14 to the respective arms 8 of the handle 4. For example, each arm 8 of the handle 4 may have a threaded opening 35 for receipt of the respective screws. To remove the padding 10, the end elements 14 can simply be unfixed from the arms 8 of the handle 4 and slid away from the lateral ends 24 of the sleeve 12 to uncover them, thereby enabling removal of the sleeve 12 and thus the underlying padding 10 from the handle 4.

As seen in FIG. 3, the end element 14 can have an inner wall defining the through-hole 32, which is shaped to provide variable contact surfaces with the sleeve 12 when the end elements 14 are mounted to the lateral ends 24 thereof to facilitate secure engagement therebetween.

Figure 5A:
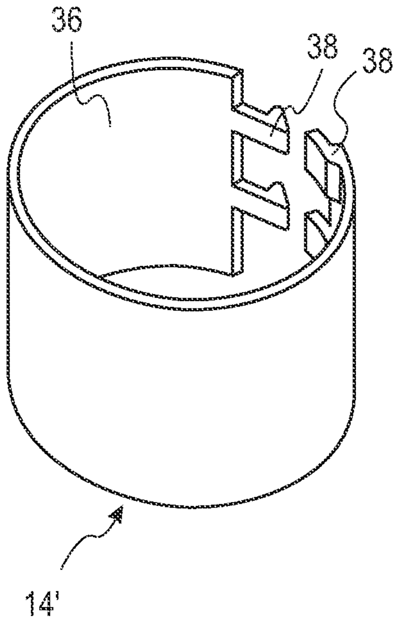
FIG. 5A is a schematic illustration of a side perspective view of an end element in an unlocked state, that can form part of a removable cover kit, according to a further example of the presently disclosed subject matter.
Figure 5B:
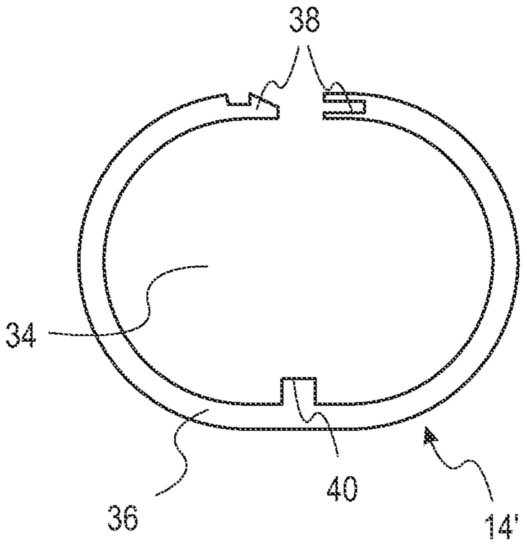
FIG. 5B is a schematic illustration of a top view of the end element of FIG. 5A.

FIGS. 5A and 5B show another example of an end element 14' that can form part of the present removable cover kit 2 of any one of the above-described examples. In this case, the end element 14' comprises a selectively openable ring-like body 36. For example, each end of the openable ring 14' may be configured with complementary interlocking features 38, such as teeth or the like, which enable the ring 14' to be selectively opened to apply and remove the end element 14' to and from, respectively, an arm 8 of the handle 4, and closed to retain the ring element 14' to the handle 4. An interior face of the ring 14' may also comprise a fixing means, such as a raised protrusion or pin-like member 40 configured to be located into a corresponding opening formed in a respective arm 8 of the handle 4. In this way, the ring-like end element 14' functions like a removable clasp that can be clipped over the lateral arms 8 of the handle 4 and the lateral ends 26, 24 of the sleeve 12 and/or the padding 10 and removed therefrom to permit removal of the sleeve 12 and the padding 10 from the handle 4, all without needing to detach the handle 4 from the device to which it is secured.

Figure 6A:
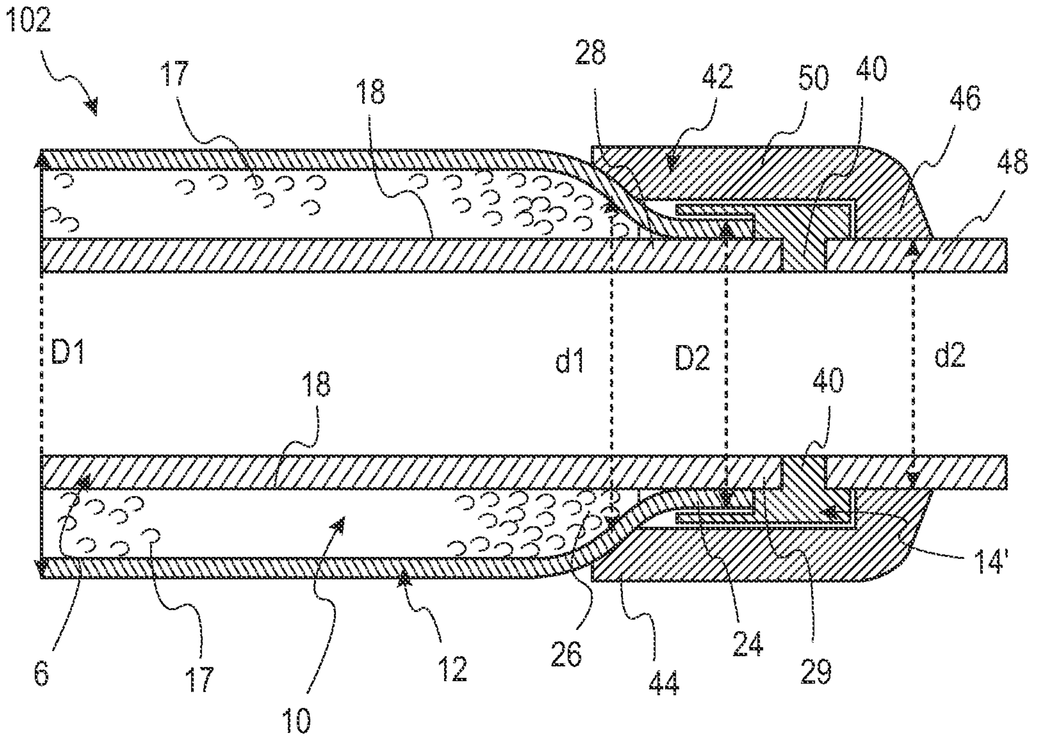
FIG. 6A is a schematic illustration of a close-up longitudinal cross-sectional front view of a lateral end of a removable cover kit according to a further example of the presently disclosed subject matter, the kit shown assembled to a handle portion having a generally circular cross-section.

FIG. 6A shows a schematic close-up cross-sectional view of a lateral end of a removable cover kit 102 according to another example of the presently disclosed subject matter. The kit 102 is shown assembled to a tubular handle portion 6 having a generally circular cross-section. The padding 10 encases the handle portion 6 and the sleeve 12 is sheathed tightly over the padding 10. The sleeve 12 has a length between its opposed lateral ends 24 which exceeds that of the padding 10 between the lateral ends 26 thereof. As such, when assembled, the lateral ends 24 of the tubular sleeve 12 cover and extend longitudinally beyond the respective lateral ends 26 of the padding 10 such that the lateral ends 24 of the sleeve 12 also sheathe respective adjacent handle regions 28 that protrude out from respective lateral ends 26 of the padding 10.

In the closed state, the sleeve 12 has a generally tubular form having a diameter and thus cross-sectional area that varies along the length of the sleeve 12. In particular, along a majority of the length of the closed tubular sleeve 12, the sleeve 12 has a first cross-sectional area, associated with a first inner diameter D1, sized to tightly sheathe the padding 10. However, the opposed lateral ends 24 of the tubular sleeve 12 define a second cross-sectional area, associated with a second inner diameter D2, that is smaller than the first cross-sectional area, the second cross-sectional area being sized to tightly sheathe the adjacent handle regions 28 that protrude from respective lateral ends 26 of the padding 10.

With reference to FIG. 6A, the cross-sectional area of the sleeve 12 is substantially constant along the majority of its length, and then gradually reduces to the second cross-sectional area at the respective lateral ends 24 thereof. As such, the lateral ends 24 of the closed tubular sleeve 12 radially constrict or taper inwardly over respective lateral ends 26 of the padding 10 and narrow inwardly toward the adjacent handle regions 28 protruding from respective lateral ends 26 of the padding 10. Consequently, even though the mounted padding 10 has an outer diameter that is larger than that of the handle portion 6 encased thereby, the tubular sleeve 12 can tightly sheathe both the padding 10 and the adjacent handle regions 28 protruding from lateral ends 26 of the padding 10 because the cross-sectional area and thus diameter of the closed sleeve 12 reduces toward and at the lateral ends 24 thereof so that the sleeve 12 fits tightly over both the padding 10 and the respective adjacent handle regions 28 protruding from lateral ends 26 of the padding 10.

The sleeve 12 is in the form of a sheet material such that, when the sleeve 12 is in the open state (i.e. the longitudinal ends 22 of the sleeve 12 are separated from one another), a lateral dimension of the sleeve 12 (i.e. a width) at and adjacent the opposed lateral ends 24 thereof is smaller than a lateral dimension of the sleeve 12 along a majority of the remainder of the sleeve 12 between the lateral ends 24 thereof. For example, in the open state, the sleeve 12 may generally be in the form of a rectangle with inverted rounded corners.

Figure 6B:
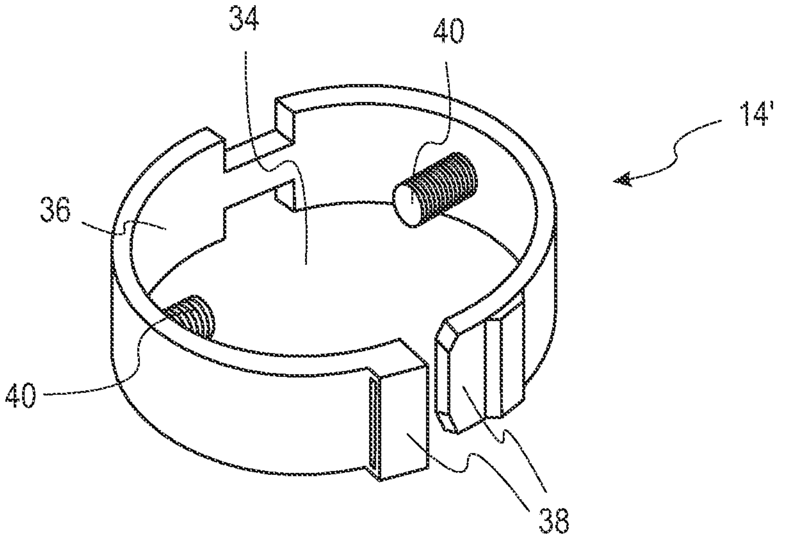
FIG. 6B is a schematic illustration of a top perspective view of an end element of the removable cover kit of FIG. 6A, the end element shown in an unlocked state.

FIG. 6A also shows an end element 14' that is removably secured to the handle 4 via a handle section 29 protruding from a lateral end 24 of the sleeve 12. The end element 14' is configured to cover and protect at least the lateral ends 24 of the closed sleeve 12. The end element 14' is illustrated in FIG. 6B and is functionally and structurally similar to that of the end element 14' described and depicted with reference to FIGS. 5A and 5B, wherein like reference numerals denote like features. The end element 14' depicted in FIG. 6B comprises an opposed pair of pin-like members 40 protruding toward one another from an interior face of the ring-like body 36 of the end element 14', each pin 140 being configured to be located in a corresponding opening 35 of the handle 4.

The kit 102 depicted in FIG. 6A also comprises end coverings 42 that are removably securable over respective end elements 14'. The depicted end covering 42 substantially encloses or covers the end element 14' such that the end element 14' cannot be intentionally or inadvertently physically accessed, removed or otherwise manipulated unless the end covering 42 is first removed from the handle section 29 to which the end covering 42 is secured. The end covering 42 may also be configured to enclose a portion of the closed sleeve 12 at or adjacent to a respective lateral end 24 thereof. In FIG. 6A, the end covering 42 comprises a relatively short, tubular body 50. An inner lateral end 44 of the tubular end covering 42 has a first inner diameter d1 and corresponding internal cross-sectional area sized to tightly fit over and cover a portion of the sleeve 12 at or adjacent the lateral ends 24 thereof. In FIG. 6A, the inner lateral end 44 of the tubular body 50 fits over the sleeve 12 at a location where the cross-sectional area thereof begins reducing towards the second cross-sectional area of the sleeve 12. As such, the inner lateral end 44 of the end covering 42 is sized to tightly engage a respective lateral end 24 of the sleeve 12, or a section adjacent thereto, beneath which the lateral ends 26 of the padding 10 are sheathed by the sleeve 12.

Starting from the inner lateral end 44 of the end covering 42 and progressing along the length thereof, the inner circular cross-sectional area of the end covering 42 remains substantially constant (though in other examples, may gradually reduce) so that the end covering 42 maintains a tight or close-fitting engagement with the end element 14' concealed therein. An outer lateral end 46 of the tubular end covering 42 is associated with a second inner diameter d2 that is smaller than the first inner diameter d1, and thus the inner cross-sectional area at the outer lateral end 46 of the end covering 42 is smaller than that along the majority of the length of the end covering 42. The smaller cross-sectional area at the outer lateral end 46 of the end covering 42 is sized so that the outer lateral end 46 thereof can tightly grip, enclose or otherwise engage against a handle area 48 protruding from the end element 14'. In FIG. 6A, the end covering 42 generally has the form of an end cap, with a smaller opening (associated with smaller diameter d2) at the outer lateral end 46 for tightly receiving the adjacent handle area 48, and a larger opening (associated with larger diameter d1) at the inner lateral end 44 for tightly receiving lateral ends 24 of the sleeve 12 and any padding 10 therebeneath. The tubular end cap-like covering 42 may serve an aesthetic and/or protective function and may be formed from a variety of materials, from relatively rigid plastics to deformable and/or resilient elastomers and natural/synthetic leather. In one example, the end covering 42 may be in the form of a tubular sleeve that is slidable along the handle 4 toward a respective end element 14' to enclose it. In another example, the end covering 42 may be openable and closable along its length (e.g. via zippers, snap-lock features and other reversible securing means) to allow for application and removal of the end covering 42 relative to the handle 4, and securement thereto.

Figure 7:
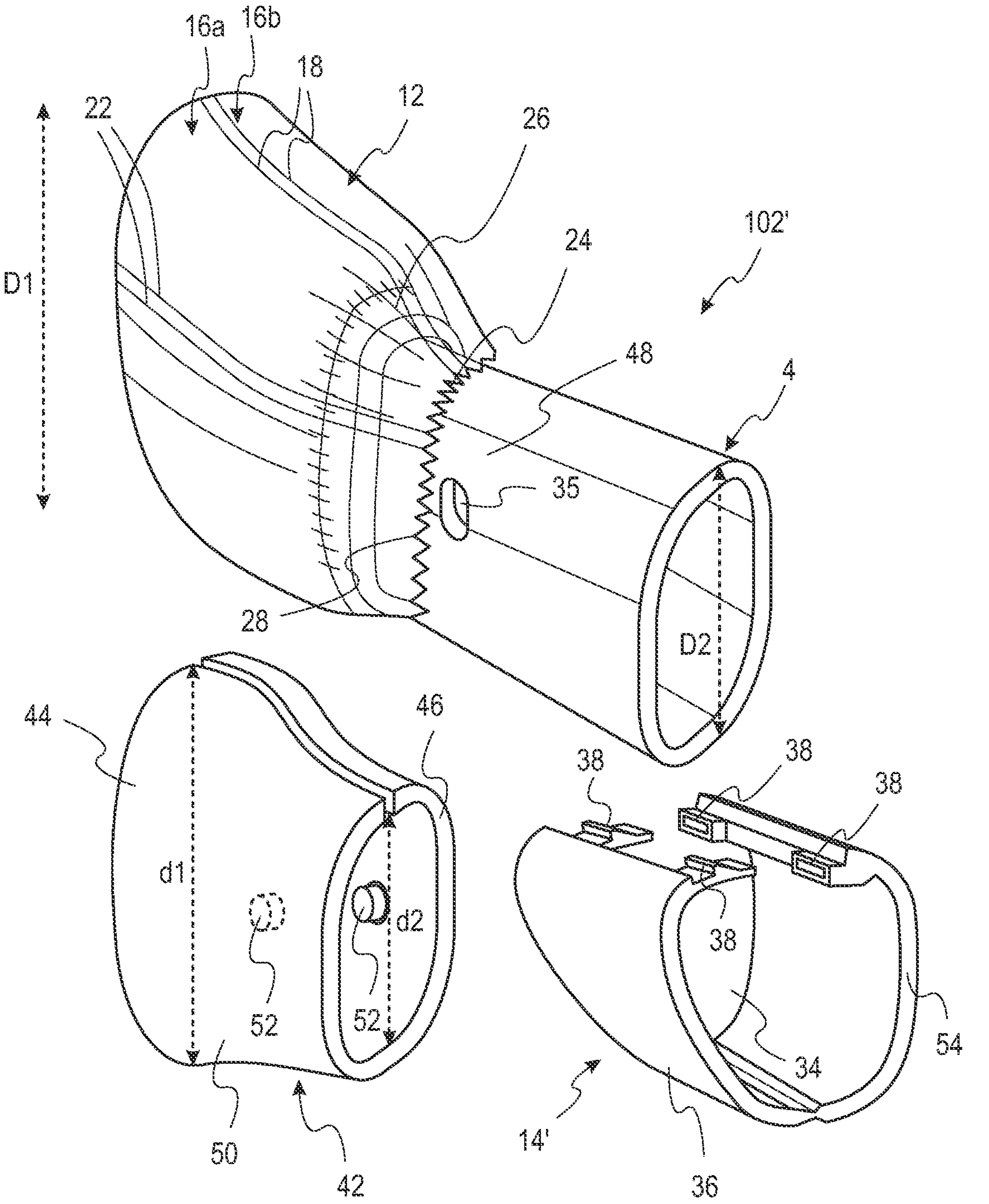
FIG. 7 is a schematic illustration of a close-up end perspective view of a removable cover kit according to a further example of the presently disclosed subject matter, wherein a padding and a sleeve of the kit are shown assembled to a handle portion having a generally oval-shaped cross-section, and wherein an end covering and an unlocked end element of the kit are shown prior to assembly to the handle portion.

FIG. 7 shows another example of a removable handle cover kit 102' which is a variation of the removable handle cover kit of FIG. 6A. In the kit 102' depicted in FIG. 7, the padding 16, sleeve 12, end element 14' and end covering 42 are adapted to be assembled to an elongate handle 4, or portion thereof, having a generally oval-shaped or elliptical cross-section. The end element 14' and end covering 42 are shown not yet assembled to the handle 4, and the end element 14' is shown in an open and unlocked state. It will be appreciated that like reference numerals denote like features.

In FIG. 7, the sleeve 12 is depicted as transparent and the two padding parts 16*a*, 16*b* sheathed thereby are visible. The sleeve 12 comprises a zipper running along the longitudinal sides 22 thereof to enable said longitudinal sides 22 to be selectively secured to one another to configure the sleeve 12 between its open and closed states. The sleeve 12 may be configured such that in the closed state, the zipper is visually hidden or concealed beneath overlying material of the sleeve 12.

The end covering 42 comprises a relatively short tubular body 50 having a generally elliptical internal cross-sectional area that varies in size along the length of the body 50. As such, an inner major diameter of the elliptical end covering 42 also varies along its length. In the present example, a first lateral end 44 of the end covering 42 has a first internal cross-sectional area, associated with a first major diameter d1, sized to tightly receive and cover a portion of the closed sleeve 12 at and adjacent a lateral end 24 thereof. An opposite second lateral end 46 of the end covering 42 has a second internal cross-sectional area, associated with a second major diameter d2, sized to tightly receive an adjacent handle area 48 protruding from the end element 14'. The second cross-sectional area of the end covering 42 is smaller than the first cross-sectional area thereof, and thus the corresponding second major diameter d2 of the end covering 42 is smaller than the first major diameter d1 thereof. Progressing along the length of the end covering 42 from the first lateral end 44 to the second lateral end 46, the inner major diameter and thus the corresponding elliptical cross-sectional area of the end covering 42 gradually reduces along a length of the end covering 42 and about a central longitudinal axis thereof. In this way, the form of the end covering 42 is not dissimilar to that of a converging nozzle.

The end covering 42 may be formed from a deformable and/or resilient type of material. The end covering 42 may also have releasable securing means along its length, such as a zipper, to enable the end covering 42 to be opened to permit application and removal of the end covering 42 relative to the handle 4 or portion thereof, and closed to secure the end covering 42 to the handle 4. The end covering 42 depicted in FIG. 7 also comprises a pair of opposed openings 52, each in a respective sidewall of the tubular body 50 thereof, the openings 52 being alignable with corresponding openings 35 in the handle 4 and capable of receiving fixing means, such as screws, to releasably fix the end covering 42 to the handle 4. When the kit 102' of FIG. 7 is assembled, it is envisaged that the fixing means would be disposed behind a rear end or edge 54 of the end element 14'. As such, the fixing means also physically obstructs the end element 14' from sliding or otherwise moving away from the padding 10 and sleeve 12.

Figure 8:
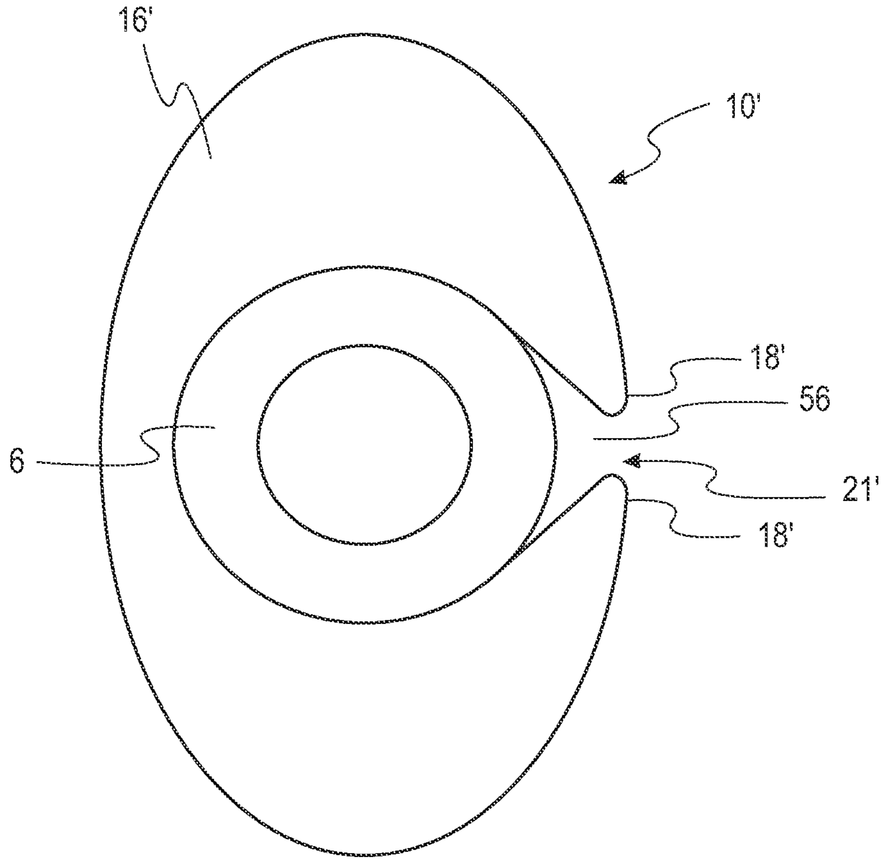
FIG. 8 is a schematic illustration of a cross-sectional view of a handle portion encased by a padding that can form part of a removable cover kit according to a further example of the presently disclosed subject matter, the cross-sectional view taken perpendicular to a longitudinal axis of the handle.

Whilst the padding 10 described in the above examples is formed of two padding parts, the padding can be constituted by a single part as illustrated in FIG. 8 showing a padding 10' that can form part of any of the removable cover kits 2 described above as well as any other kit according to the presently disclosed subject matter.

In the example of FIG. 8, the padding 10' has a C-shaped cross-sectional shape of its inner and outer surfaces, however, the 'tips' (i.e. the padding edges 18') of the 'C' are formed quite close to one another, leaving a small gap 56 therebetween through which an elongate handle portion 6 can be urged so as to be received in a channel 21' of the padding 10' so as to be encased therein. FIG. 8 shows the padding 10' in its closed configuration, wherein the handle portion 6 is encased by the single padding part 16' such that a longitudinal axis of the padding 10' is substantially aligned with that of the encased handle portion 6. During removal of the padding 10' from the handle portion 6, or during mounting thereon, the padding 10' is moved relative to the handle 4 such that the central handle portion 6 temporarily sits between the opposed padding edges 18' of the padding 10'. At this stage, the padding edges 18' are more spaced from one another along their lengths than when the padding 10' is in the closed configuration; in this temporary open configuration of the padding 10', the handle portion 6 can be inserted into or removed from the padding 10'.

While various embodiments have been described herein, it should be understood that they have been presented by way of example only, and not by way of limitation. It will be apparent to a person skilled in the relevant art that various changes in form and detail can be made without departing from the spirit and scope of the invention. Thus, the scope of the present specification should not be limited by the embodiments described and depicted herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

What is claimed is:

1. A removable cover kit for an elongated article, the removable cover kit comprising:

a padding for removably encasing at least a portion of the article having a predetermined length, the padding comprising one or more padding parts associated with padding edges and being configurable between:

a closed configuration in which:

the padding defines a housing when the padding is mounted on the article, the housing having a longitudinal axis extending along the length of said at least a portion of the article; and the padding edges are proximate to one another along respective lengths thereof and an inner surface of the padding extending between said edges fits that of the at least a portion of the article; and an open configuration for mounting of the padding on the article or for removal of the padding therefrom, wherein the padding edges are remote from one another; and a sleeve for removably sheathing over the padding when the padding is in the closed configuration and mounted to the article, wherein the sleeve is configurable between:

an open state in which the sleeve is applicable over the padding when the padding is in the closed configuration and mounted to the article; and a closed state in which the sleeve is secured over and sheathes the padding when the padding is in the closed configuration and mounted to the article;

wherein the sleeve has a lateral dimension in the open state and a corresponding cross-sectional area in the closed state, which vary along a length of the sleeve, so that the lateral dimension of the sleeve in the open state and the cross-sectional area of the sleeve in the closed state being smaller adjacent lateral ends of the sleeve than along a majority of the remainder of the sleeve.

2. The kit of claim 1, wherein the padding comprises at least two padding parts, each formed with a recess bounded by two padding edges which, in the closed configuration of the padding, contact respective padding edges of another padding part at least along most of the respective lengths of the padding edges.

3. The kit of claim 2, wherein the at least two padding parts are configured to be brought together into the closed configuration of the padding over the at least a portion of the article for encasement thereof, the recesses of the at least two padding parts having shape and dimensions corresponding to those of the respective surfaces of the at least a portion of the article.

4. The kit of claim 2, wherein the sleeve has a tubular form so as to inhibit separation of the at least two padding parts from each other.

5. The kit of claim 1, wherein at least in the closed configuration, the inner surface of the padding defines a channel which extends along said longitudinal axis.

6. The kit of claim 1, wherein the sleeve comprises two longitudinal ends connectable to one another to bring the sleeve from the open state to the closed state.

7. The kit of claim 1, further comprising a pair of end elements, each being removably securable to one of respective portions of the article so as to, when the kit is assembled thereon, at least partially cover the lateral ends of the padding and/or the lateral ends of the sleeve from which said respective portions of the article protrude.

8. The kit of claim 7, wherein each end element is removable from the respective portions of the article or movable therealong and away from respective lateral ends of the sleeve to permit removal of the padding from the article.

9. The kit of claim 7, further comprising a pair of end coverings, each being removably securable to one of respective areas of the article so as to, when the kit is assembled, substantially cover respective end elements and/or respective lateral ends of the sleeve.

10. The kit of claim 1, wherein the padding is made of a material incapable of being stretched to such extent that if a unitary tubular casing having an inner surface of the same shape and dimensions as those of the inner surface of the padding when in the closed configuration was to be produced from such material, such casing would be incapable of being dressed over the article from an end thereof.

11. The kit of claim 1, wherein the padding is made of a material in the form of an expanded particle foam.

12. The kit of claim 11, wherein said material is polypropylene.

13. The kit of claim 1, wherein the sleeve is made of a synthetic or natural leather.

14. The kit of claim 1, wherein the sleeve retains said padding edges proximate to one another.

15. An elongated article fitted with the removable cover assembled from a kit according to claim 1.

16. The article of claim 15, wherein the article is a handle.

17. The article of claim 15, wherein the article is of a kind which is incapable of being inserted from an end thereof into a casing corresponding in shape and dimensions to the padding when in the closed configuration.

* * * * *